(12) United States Patent
Stern et al.

(10) Patent No.: US 8,316,201 B2
(45) Date of Patent: Nov. 20, 2012

(54) METHODS FOR EXECUTING A COMMAND TO WRITE DATA FROM A SOURCE LOCATION TO A DESTINATION LOCATION IN A MEMORY DEVICE

(75) Inventors: Ori Moshe Stern, Modeen (IL); Robert David Selinger, San Jose, CA (US); Sandra Almog Goldschmidt, Moshav Elishama (IL)

(73) Assignee: SanDisk IL Ltd., Kfar Saba (IL)

( * ) Notice: Subject to any disclaimer, the term of this patent is extended or adjusted under 35 U.S.C. 154(b) by 243 days.

(21) Appl. No.: 12/544,529

(22) Filed: Aug. 20, 2009

(65) Prior Publication Data

US 2010/0161882 A1 Jun. 24, 2010

Related U.S. Application Data

(63) Continuation-in-part of application No. 12/338,378, filed on Dec. 18, 2008.

(51) Int. Cl.
*G06F 12/00* (2006.01)
(52) U.S. Cl. .................. 711/165; 711/202; 711/203
(58) Field of Classification Search .................. 711/165, 711/202, 203
See application file for complete search history.

(56) References Cited

U.S. PATENT DOCUMENTS

| | | | |
|---|---|---|---|
| 5,404,485 A | 4/1995 | Ban | |
| 5,434,825 A | 7/1995 | Harari | |
| 5,532,962 A | 7/1996 | Auclair et al. | |
| 5,799,168 A | 8/1998 | Ban | |
| 5,818,757 A | 10/1998 | So et al. | |
| 5,937,425 A | 8/1999 | Ban | |
| 5,943,283 A | 8/1999 | Wong et al. | |
| 6,034,882 A | 3/2000 | Johnson et al. | |
| 6,119,245 A | 9/2000 | Hiratsuka | |
| 6,181,599 B1 | 1/2001 | Gongwer | |
| 6,185,122 B1 | 2/2001 | Johnson et al. | |
| 6,230,233 B1 | 5/2001 | Lofgren et al. | |
| 6,266,273 B1 * | 7/2001 | Conley et al. ............ 365/185.11 |

(Continued)

FOREIGN PATENT DOCUMENTS

EP 1 146 428 10/2007

(Continued)

OTHER PUBLICATIONS

Non Patent Literature, "On Efficient Wear Leveling for Large-Scale Flash-Memory Storage Systems", Change published Mar. 15, 2007, pp. 1127-1130.*

(Continued)

*Primary Examiner* — Jared Rutz
*Assistant Examiner* — Gurtej Bansal
(74) *Attorney, Agent, or Firm* — Brinks Hofer Gilson & Lione

(57) ABSTRACT

The embodiments described herein provide methods for executing a command to write data from a source location to a destination location in a memory device. In one embodiment, a memory device receives, from a host device, a command to write data from a source location to a destination location in the memory device. The memory device executes the command by changing the memory device's logical-to-physical address map without reading the data from the source location and writing the data to the destination location and without a need of further involvement of the host device after the host device sends the command to the memory device.

20 Claims, 4 Drawing Sheets

U.S. PATENT DOCUMENTS

| Patent No. | Date | Inventor(s) | Ref. |
|---|---|---|---|
| 6,317,799 B1 * | 11/2001 | Futral et al. | 710/22 |
| 6,420,215 B1 | 7/2002 | Knall et al. | |
| 6,426,893 B1 | 7/2002 | Conley et al. | |
| 6,498,851 B1 | 12/2002 | Wong | |
| 6,591,330 B2 | 7/2003 | Lasser | |
| 6,594,183 B1 * | 7/2003 | Lofgren et al. | 365/185.33 |
| 6,624,773 B2 | 9/2003 | Wong | |
| 6,631,085 B2 | 10/2003 | Kleveland et al. | |
| 6,683,817 B2 | 1/2004 | Wei et al. | |
| 6,694,415 B2 | 2/2004 | March et al. | |
| 6,715,044 B2 | 3/2004 | Lofgren et al. | |
| 6,721,820 B2 | 4/2004 | Zilberman et al. | |
| 6,760,805 B2 | 7/2004 | Lasser | |
| 6,988,175 B2 | 1/2006 | Lasser | |
| 7,012,835 B2 | 3/2006 | Gonzalez et al. | |
| 7,081,377 B2 | 7/2006 | Cleeves | |
| 7,120,729 B2 | 10/2006 | Gonzalez et al. | |
| 7,136,973 B2 | 11/2006 | Sinclair | |
| 7,149,119 B2 | 12/2006 | Fasoli | |
| 7,170,788 B1 | 1/2007 | Wan et al. | |
| 7,171,536 B2 | 1/2007 | Chang et al. | |
| 7,177,191 B2 | 2/2007 | Fasoli | |
| 7,177,977 B2 | 2/2007 | Chen et al. | |
| 7,187,583 B2 | 3/2007 | Yang et al. | |
| 7,218,552 B1 | 5/2007 | Wan et al. | |
| 7,224,607 B2 | 5/2007 | Gonzalez et al. | |
| 7,234,049 B2 | 6/2007 | Choi et al. | |
| 7,239,556 B2 | 7/2007 | Abe et al. | |
| 7,262,994 B2 | 8/2007 | Fong et al. | |
| 7,295,473 B2 | 11/2007 | Fong et al. | |
| 7,345,907 B2 | 3/2008 | Scheuerlein | |
| 7,349,258 B2 | 3/2008 | Fong et al. | |
| 7,355,888 B2 | 4/2008 | Hemink et al. | |
| 7,355,889 B2 | 4/2008 | Hemink et al. | |
| 7,362,604 B2 | 4/2008 | Scheuerlein | |
| 7,366,029 B2 | 4/2008 | Kagan | |
| 7,379,330 B2 | 5/2008 | Conley et al. | |
| 7,379,334 B2 | 5/2008 | Murakami et al. | |
| 7,392,343 B2 | 6/2008 | Oshima | |
| 7,406,572 B1 | 7/2008 | Nguyen | |
| 7,426,137 B2 | 9/2008 | Hemink | |
| 7,433,241 B2 | 10/2008 | Dong et al. | |
| 7,436,713 B2 | 10/2008 | Hemink | |
| 7,440,318 B2 | 10/2008 | Fong et al. | |
| 7,440,323 B2 | 10/2008 | Lutze et al. | |
| 7,443,736 B2 | 10/2008 | Samachisa | |
| 7,447,065 B2 | 11/2008 | Fong et al. | |
| 7,447,066 B2 | 11/2008 | Conley et al. | |
| 7,450,430 B2 | 11/2008 | Hemink et al. | |
| 7,463,531 B2 | 12/2008 | Hemink et al. | |
| 7,464,259 B2 | 12/2008 | Sukegawa et al. | |
| 7,468,911 B2 | 12/2008 | Lutze et al. | |
| 7,468,918 B2 | 12/2008 | Dong et al. | |
| 7,475,184 B2 | 1/2009 | Lee | |
| 7,477,547 B2 | 1/2009 | Lin | |
| 7,495,956 B2 | 2/2009 | Fong et al. | |
| 7,499,326 B2 | 3/2009 | Hemink | |
| 7,890,732 B2 * | 2/2011 | Sukegawa | 711/206 |
| 7,941,586 B2 | 5/2011 | Kim | |
| 2001/0028523 A1 | 10/2001 | Moro et al. | |
| 2003/0028704 A1 | 2/2003 | Mukaida et al. | |
| 2003/0051118 A1 | 3/2003 | Wu et al. | |
| 2003/0065899 A1 | 4/2003 | Gorobets | |
| 2003/0079077 A1 | 4/2003 | Piau et al. | |
| 2003/0097520 A1 | 5/2003 | Lai et al. | |
| 2003/0099134 A1 | 5/2003 | Lasser et al. | |
| 2003/0135688 A1 | 7/2003 | Tai | |
| 2003/0206442 A1 | 11/2003 | Tang et al. | |
| 2003/0229645 A1 * | 12/2003 | Mogi et al. | 707/102 |
| 2004/0103234 A1 | 5/2004 | Zer et al. | |
| 2004/0205418 A1 | 10/2004 | Sakaue et al. | |
| 2005/0005055 A1 * | 1/2005 | Pasotti et al. | 711/1 |
| 2005/0050235 A1 | 3/2005 | Choi | |
| 2005/0055479 A1 * | 3/2005 | Zer et al. | 710/22 |
| 2005/0092846 A1 | 5/2005 | Lai et al. | |
| 2005/0125630 A1 | 6/2005 | Liao et al. | |
| 2005/0172065 A1 | 8/2005 | Keays | |
| 2005/0180209 A1 | 8/2005 | Lasser | |
| 2005/0207231 A1 | 9/2005 | Kim | |
| 2005/0237814 A1 | 10/2005 | Li et al. | |
| 2005/0286306 A1 | 12/2005 | Srinivasan et al. | |
| 2005/0289314 A1 | 12/2005 | Adusumilli et al. | |
| 2006/0184709 A1 | 8/2006 | Sukegawa et al. | |
| 2006/0239450 A1 | 10/2006 | Holtzman et al. | |
| 2007/0047306 A1 | 3/2007 | Roohparvar | |
| 2007/0074093 A1 | 3/2007 | Lasser et al. | |
| 2007/0088940 A1 | 4/2007 | Conley | |
| 2007/0101237 A1 * | 5/2007 | Tamura et al. | 714/763 |
| 2007/0170268 A1 | 7/2007 | Lee | |
| 2007/0263440 A1 | 11/2007 | Cornwell et al. | |
| 2007/0276987 A1 * | 11/2007 | Luo et al. | 711/103 |
| 2008/0046630 A1 | 2/2008 | Lasser | |
| 2008/0046641 A1 | 2/2008 | Lasser | |
| 2008/0151618 A1 | 6/2008 | Sharon et al. | |
| 2008/0158948 A1 | 7/2008 | Sharon et al. | |
| 2008/0222491 A1 * | 9/2008 | Lee et al. | 714/763 |
| 2008/0243954 A1 | 10/2008 | Augenstein et al. | |
| 2009/0031072 A1 * | 1/2009 | Sartore | 711/102 |
| 2009/0049229 A1 | 2/2009 | Honda et al. | |
| 2009/0132760 A1 * | 5/2009 | Flynn et al. | 711/113 |
| 2010/0023676 A1 | 1/2010 | Moon et al. | |
| 2010/0031270 A1 * | 2/2010 | Wu et al. | 718/107 |
| 2010/0082882 A1 | 4/2010 | Im et al. | |
| 2011/0131383 A1 | 6/2011 | Kim et al. | |

FOREIGN PATENT DOCUMENTS

| | | |
|---|---|---|
| WO | WO 2005/066773 | 7/2005 |
| WO | WO 2009/032945 | 3/2009 |
| WO | WO 2009/088920 | 7/2009 |
| WO | WO 2009/134576 | 11/2009 |

OTHER PUBLICATIONS

Non Patent Literature "SanDisk Flash Memory Cards Wear leveling", Oct. 2003, pp. 1-6.*

Non Patent Literature, "Microsoft Windows Internals: Microsoft Windows Server tm 2003, Windows XP and Windows 2000, Fourth Edition", published Dec. 8, 2004, Solomon, pp. xi, 280, 373, 564.*

Non Patent Literature, "White Paper: Flash Memory", published Oct. 2007, Brown, pp. 70-71.*

Open NAND Flash Interface (ONFI) Specification, Revision 2.0, Feb. 27, 2008, 174 pages.

Clause 8.2.3 and other sections of Clause 8, SCSI-2 Specification, 1994, 73 pages.

"Methods for Writing Data from a Source Location to a Destination Location in a Memory Device," U.S. Appl. No. 12/338,378, filed Dec. 18, 2008 by on Ori Stern, Micha Rave, Robert Selinger, and Sandra Almog Goldschmidt.

"ONFI Working on Next-Generation NAND Specifications: ONFI 3.0 and EZNAND," 1 page, Jan. 6, 2010.

"Micron NAND Flash Memory: MT29F4G08AAA, MT29F8G08BAA, MT29F8G08DAA, MT29F16G08FAA," http://download.micron.com/pdf/datasheets/flash/nand/4gb_nand_m40a.pdf, 1 page, 2006.

"Siemens Internal Flash Data Management," 2 pages, Siemens AG 2006.

Abraham, "Flash Standards for Embedded Systems," Aug. 2008, 22 pages.

Cooke, "Micron e-MMC Embedded Memory Simplifies High Capacity Storage for Mobile and Embedded Solutions," 2007, 7 pages.

Cooke, J., Microsoft WinHec 2007, "Flash Memory Technology Direction", Apr. 30, 2007, pp. 1-11.

Cooke, J., Powerpoint Presentation, Flash Memory Summit, "NAND 101, An Introduction to NAND Flash and How to Design It in to Your Next Product", Aug. 8, 2006, pp. 1-68.

Denali Software, "Spectra™ NAND Flash File System", http://www.denali.com/en/products/spectra_ffs.jsp, copyright 1994-2009, retrieved on Aug. 6, 2009, pp. 1-3.

EE Times Asia, "Toshiba Mixes LBA to NAND Flash Memory", http://www.eetasia.com/ARTP_8800428816_499486.HTM, posted on Aug. 9, 2006, 1 page.

Grimsrud, K., Powerpoint Presentation, "Intel Developer Forum", 2007, pp. 1-30.
Heye, R., Powerpoint Presentation, "Microsoft WinHec 2008 Advancing the Platform-MLC NAND in the PC, Planning for Success", 2008, pp. 1-34.
"Innovation, Simplify Embedded NAND Flash Design", Adverstisement, 1 page.
Inoue, A. et al., "NAND Flash Applications Design Guide, System Solutions from Toshiba America Electronic Components, Inc.", Revision 1.0, Apr. 2003, pp. 1-29.
"Open NAND Flash Interface Specification", Revision 2.1, Jan. 14, 2009, pp. 1-201.
Roohparvar, F., Powerpoint Presentation, Flash Memory Summit, "The Future of Wireless Flash", Aug. 2006, pp. 1-29.
"Samsung Electronics Develops World's First Eight-Die Multi-Chip Package for Multimedia Cell Phones", http://www.samsung.com/us/business/seimconductor/newsView.do?news_id=628.0, Jan. 10, 2005.
Schwaderer, W. et al., "Understanding I/O Subsystems, First Edition", *Adaptec Press*, 1996, pp. ii-iii, 82-87, 176-191.
Serial ATA, "High Speed Serialized AT Attachment", Revision 1.0a, Jan. 7, 2003, 2 pages (title page and p. 144).
"Simplify MLC NAND Design with Toshiba Embedded NAND Solutions", http://www.toshiba.com/taec/adinfo/embeddednand/, retrieved on Aug. 4, 2009, 2 pages.
"Toshiba LBA-NAND Simplifies Integration", http://www.toshiba.com/taec/adinfo/embeddednand/images/LBAblockDiagram.jpg, retrieved on Aug. 4, 2009, 1 page.
Toshiba TC58NVG1S3BFT00/TC58NVG1S8BFT000 Tentative, Toshiba MOS Digital Integrated Circuit Silicon Gate CMOS, Oct. 30, 2003, pp. 1-37.
Toshiba TC58NVG2D4BFT00/TC58NVG2D9BFT000 Tentative, Toshiba MOS Digital Integrated Circuit Silicon Gate CMOS, Oct. 30, 2003, pp. 1-37.
"USB 2.0 High-Speed Flash Drive Controller, ST72681", Revision Feb. 6, 2009 (previous revisions May 2005-Jan. 2009), pp. 1-34.
Wikipedia, "Southbridge (Computing)", http://en.wikipedia.org/wiki/Southbridge_(computing), Retrieved on Aug. 4, 2009, pp. 1-2.
Notification of the First Office Action (with translation) for Chinese Patent Application No.200680035631.0, 14 pages, Jul. 13, 1010.
Search Report for European Patent Application Serial No. 06796108.6, dated May 7, 2009, 8 pages.
Examination Report for European Patent Application Serial No. 06796108.6, dated Feb. 17, 2010, 5 pages.
Extended Search Report for European Patent Application Serial No. 09009022.6, dated Sep. 21, 2009, 9 pages.
Examination Report for European Patent Application Serial No. 09009022.6, dated May 4, 2010, 6 pages.
Second Notice of Grounds for Refusal for Korean Patent Application Serial No. 10-2008-7007225, dated May 11, 2010, 5 pages.
Invitation to Pay Additional Fees for PCT/US2010/057386, dated Sep. 12, 2011, 5 pages.
International Search Report and Written Opinion for PCT/US2010/057386, dated Feb. 28, 2012, 19 pages.
Ex Parte Quayle Action for U.S. Appl. No. 11/326,336, dated Jul. 30, 2009, 12 pages.
Office Action for U.S. Appl. No. 11/806,701, dated Jun. 22, 2009, 35 pages.
Office Action for U.S. Appl. No. 11/806,701, dated Feb. 25, 2010, 27 pages.
Office Action for U.S. Appl. No. 11/806,702, dated Jun. 18, 2009, 14 pages.
Office Action for U.S. Appl. No. 11/806,702, dated Feb. 25, 2010, 9 pages.
Office Action for U.S. Appl. No. 12/338,378, dated May 4, 2011, 23 pages.
Office Action for U.S. Appl. No. 12/338,378, dated Apr. 26, 2012, 15 pages.
Office Action for U.S. Appl. No. 12/650,263, dated Jun. 28, 2012, 10 pages.
U.S. Appl. No. 12/165,141 entitled, "Partial Scrambling to Reduce Correlation," filed Jun. 30, 2008, inventors: Ori Stern, Tal Heller, and Menahem Lasser.
U.S. Appl. No. 12/199,023 entitled, "A Portable Storage Device With an Accelerated Access Speed", filed Aug. 27, 2008, inventors: Judah Gamliel and Donald Ray Bryant-Rich.
U.S. Appl. No. 12/209,697 entitled, "Method for Scrambling Data in which Scrambling Data and Scrambled Data are Stored in Corresponding Non-Volatile Memory Locations," filed Sep. 12, 2008, inventors: Jun Wan, Yupin K. Fong, and Man L. Mui.
U.S. Appl. No. 12/251,820 entitled, "Method for Page- and Block Based Scrambling in Non-Volatile Memory," filed Oct. 15, 2008, inventors: Eran Sharon and Idan Alrod.
U.S. Appl. No. 12/539,379 entitled, "Controller and Method for Providing Read Status and Spare Block Management Information in Flash Memory System", filed Aug. 11, 2009, inventor: Robert D. Selinger.
U.S. Appl. No. 12/539,394 entitled, "Controller and Method for Interfacing Between a Host Controller in a Host and a Flash Memory Device", filed Aug. 11, 2009, inventors: Eliyahou Harari, Richard R. Heye and Robert D. Selinger.
U.S. Appl. No. 12/539,407 entitled, "Controller and Method for Detecting a Transmission Error Over a NAND Interface Using Error Detection Code", filed Aug. 11, 2009, inventor: Robert D. Selinger.
U.S. Appl. No. 12/539,417 entitled, "NAND Flash Memory Controller Exporting a NAND Interface", filed Aug. 11, 2009, inventors: Eliyahou Harari, Richard R. Heye, Robert D. Selinger and Menahem Lasser.

* cited by examiner

| Logical Address | Physical Address |
|---|---|
| 1 | 1001 |
| 2 | Free |
| 3 | 1003 |
| 4 | 1004 |
| ... | ... |
| 55 | 2055 |
| 56 | 2056 |
| 57 | 2057 |
| 58 | 2058 |
| 59 | 2059 |
| 60 | 2060 |
| 61 | 2061 |
| 62 | 2062 |
| ... | ... |
| 300 | 3100 |
| 301 | 3101 |
| 302 | 3102 |
| 303 | 3103 |
| 304 | 3104 |
| 305 | 3105 |
| 306 | 3106 |
| 307 | 3107 |
| 308 | 3108 |

Figure 4A

| Logical Address | Physical Address |
|---|---|
| 1 | Free |
| 2 | 1001 |
| 3 | 1003 |
| 4 | 1004 |
| ... | ... |
| 55 | 2055 |
| 56 | 2056 |
| 57 | 2057 |
| 58 | 2058 |
| 59 | 2059 |
| 60 | 2060 |
| 61 | 2061 |
| 62 | 2062 |
| ... | ... |
| 300 | 3100 |
| 301 | 3101 |
| 302 | 3102 |
| 303 | 3103 |
| 304 | 3104 |
| 305 | 3105 |
| 306 | 3106 |
| 307 | 3107 |
| 308 | 3108 |

Figure 4B

METHODS FOR EXECUTING A COMMAND TO WRITE DATA FROM A SOURCE LOCATION TO A DESTINATION LOCATION IN A MEMORY DEVICE

CROSS-REFERENCE TO RELATED APPLICATION

This is a continuation-in-part of U.S. patent application Ser. No. 12/338,378, filed Dec. 18, 2008, which is hereby incorporated by reference.

BACKGROUND

Memory devices are often used to store data provided by a host device. In many situations, the host device needs to copy or move previously-stored data from one location in the memory device to another location in the memory device, such as, for example, when the host device is defragmenting the memory device. Standard storage device interfaces, such as Serial Advanced Technology Attachment (SATA), Fiber-Channel, and Serial Attached SCSI (SAS), do not define commands to trigger the memory device to perform a copy or move operation on its own based on logical addresses provided by the host device. Accordingly, to copy or more data in the memory device, the host device uses standard read/write commands in existing storage device interfaces. Specifically, the host device sends a standard read command to the memory device via a bus and specifies a logical address of a source location in the memory. The memory device then translates the logical address to a physical address, reads the data from the source location, and sends the read data over the bus to the host device. The host device then stores the read data in a buffer and later sends the read data back to the memory device over the bus along with a standard write command that specifies a logical address of the destination location in the memory. The memory device then translates the logical address to a physical address and writes the data to the destination location.

There are several disadvantages associated with this process of copying and moving data. Since the host device is involved in every step of the process, this process occupies the central processing unit (CPU) of the host device, wastes power, blocks other user operations that otherwise could have been performed, and requires that the host device contain a buffer to store read data. This process also ties-up the communication bus between the host device and the memory device since data is sent from the memory device to the host device and then back to the memory device. Finally, it prevents the memory device management system from performing more sophisticated optimization, such as avoiding the copy operation entirely and simply changing the internal host to memory mapping.

While standard storage device interfaces do not define commands to trigger the memory device to perform a copy or move operation on its own based on logical addresses provided by the host device, a host device can provide a command to some NAND memory devices to copy or move data between physical addresses specified by the host device. This command would be performed on a raw Flash physical device level (i.e., on the memory chip itself) and would be issued by the host device, for example, to perform a wear leveling or erase block management operation. However, ECC operations are not performed in such copy/move operations at the physical device level because error correcting code (ECC) operations are performed by a component external to the memory chip. Accordingly, the memory chip does not check or regenerate ECC, so any errors that are present in the read data would be propagated.

SUMMARY

The concept(s) presented herein can be implemented in various embodiments, and this summary includes a number of exemplary embodiments.

By way of introduction, the embodiments described below provide methods for executing a command to write data from a source location to a destination location in a memory device. In one embodiment, a memory device receives, from a host device, a command to write data from a source location to a destination location in the memory device. The memory device executes the command by changing the memory device's logical-to-physical address map without reading the data from the source location and writing the data to the destination location and without a need of further involvement of the host device after the host device sends the command to the memory device.

Other embodiments are provided, and each of the embodiments described herein can be used alone or in combination with one another. Various embodiments will now be described with reference to the attached drawings.

BRIEF DESCRIPTION OF THE DRAWINGS

FIGS. 4A and 4B are illustrations of a logical-to-physical address map of an embodiment.

DETAILED DESCRIPTION OF THE PRESENTLY PREFERRED EMBODIMENTS

The following embodiments are generally directed to methods for writing data from a source location to a destination location in a memory device. In general, these embodiments allows a host device to issue a command to copy or move data in a memory device, and the memory device will copy or move the data without the need of further involvement of the host device after the host device sends the command to the memory device. In this way, these embodiments overcome the disadvantages discussed above of the current process of copying and moving data in a memory device. Since the host device is not involved in every step of the process in these embodiments, the central processing unit (CPU) of the host device is free to perform other activities or can save power. Further, because the communication bus between the host device and the memory device is not tied-up in the process of copying or moving data in these embodiments, the communication bus is available for other actions. Additionally, since data need not be transferred to the host device in the copy/move operations in these embodiments, the host device does not need to dedicate a buffer for such operations, as in prior schemes.

Figure 1:
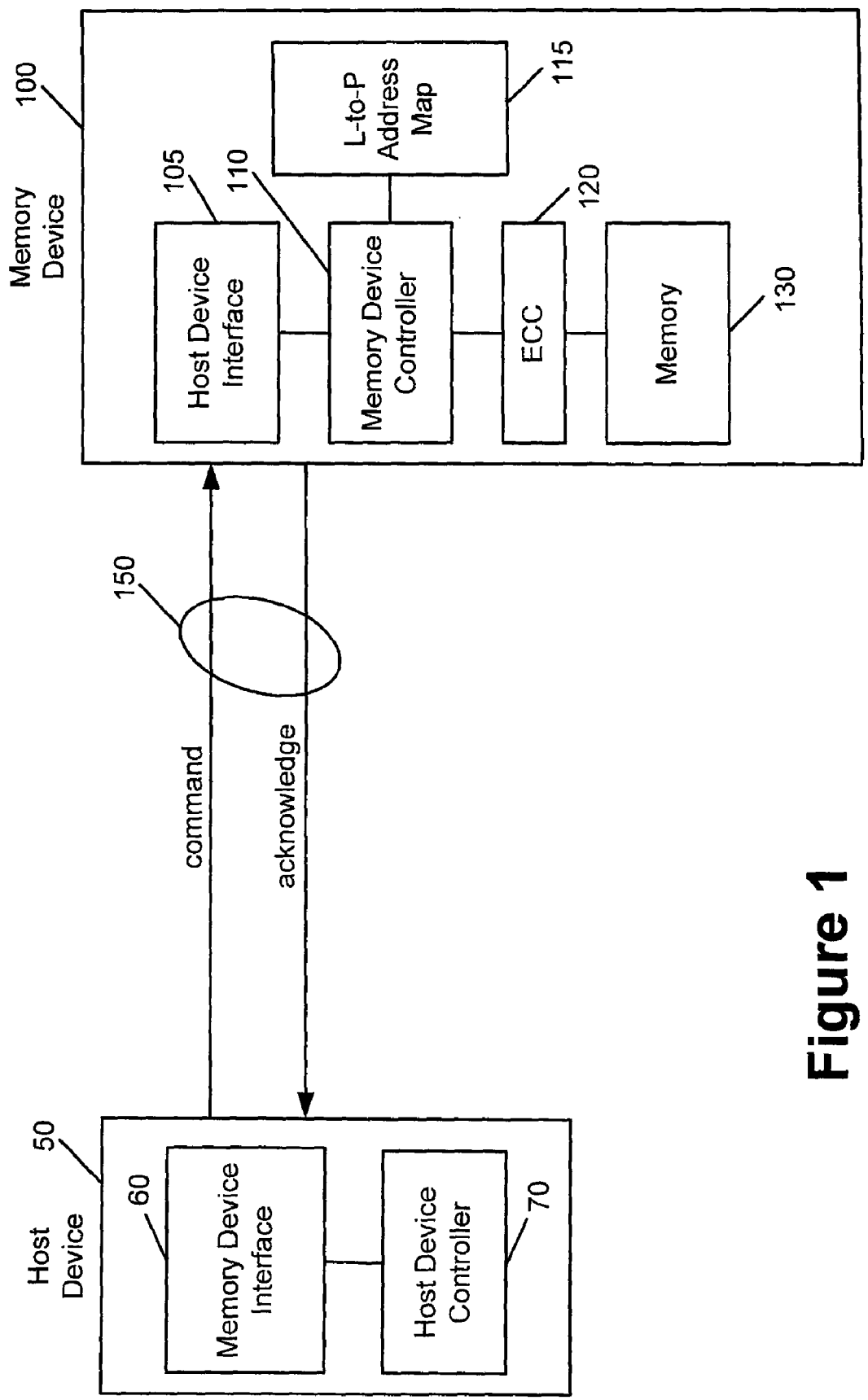
FIG. 1 is a block diagram of a host device in communication with a memory device of an embodiment.

Turning now to the drawings, FIG. 1 is a block diagram of a host device 50 in communication with a memory device 100 of an embodiment via a communication bus 150. The communication bus 150 can use any suitable interface standard including, but not limited to, Serial Advanced Technology Attachment (SATA), Advanced Technology Attachment (ATA), Small Computer System Interface (SCSI), Fibre Channel, Serial Attached SCSI (SAS), Secure Digital (SD), Embedded Multi-Media Card (EMMC), and Universal Flash Storage (UFS).

As used herein, the phrase "in communication with" means in direct communication with or in indirect communication with via one or more components named or unnamed herein (e.g., a memory card reader). The host device 50 and the memory device 100 can be in communication with each other via a wired or wireless connection. For example, in one embodiment, the memory device 100 can comprise pins (or a socket) to mate with a corresponding socket (or pins) on the host device 50 to establish an electrical and physical connection. In another embodiment, the memory device 100 comprises a wireless transceiver to place the host device 50 and memory device 100 in wireless communication with each other.

The host device 50 can take any suitable form, such as, but not limited to, a personal computer, a mobile phone, a game device, a personal digital assistant (PDA), an email/text messaging device, a digital camera, a digital media (e.g., MP3) player, a GPS navigation device, and a TV system. The memory device 100 can also take any suitable form, such as, but not limited to, a universal serial bus (USB) device, a memory card (e.g., an SD card), a hard disk drive (HDD), a solid state drive (SSD), and a redundant array of independent disks (RAID). Also, instead of the host device 50 and the memory device 100 being separately housed from each other, such as when the host device 50 is a notebook computer and the memory device 100 is an SD card, the host device 50 and the memory device 100 can be contained in the same housing, such as when the host device 50 is a notebook computer and the memory device 100 is a hard disk drive (HDD) or solid-state drive (SSD) internal to the housing of the computer.

As shown in FIG. 1, the host device 50 of this embodiment comprises a memory device interface 60 and a host device controller 70. In general, the memory device interface 60 is configured to send commands and receive acknowledgments from the memory device 100 using the interface standard appropriate for the communication bus 150. The host device controller 70 is operative to control various operations of the host device 50. The memory device 100 contains a host device interface 105, which, complementary to the memory device interface 60 in the host device 50, is configured to receive commands and send acknowledgments to the host device 50 using the interface standard appropriate for the communication bus 150. The memory device 100 also contains a memory device controller 110 operative to control various operations of the memory device 100, a logical-to-physical (L-to-P) address map 115 to translate logical address provided by the host device 50 to physical addresses of the memory 130, an optional error correcting code (ECC) block 120 to perform ECC operations, and the memory 130 itself.

The memory 130 can take any suitable form, such as, but not limited to, a solid-state memory (e.g., flash memory), optical memory, and magnetic memory. While the memory 130 is preferably non-volatile, a volatile memory can also be used. Also, the memory 130 can be one-time programmable, few-time programmable, or many-time programmable. In one preferred embodiment, the memory 130 takes the form of a raw NAND die; however, a raw NOR die or other form of solid state memory can be used.

It should be noted that the host device 50 and the memory device 100 can comprise additional components, which are not shown in FIG. 1 to simplify the drawing. Also, in some embodiments, not all of the components shown are present. For example, when the memory device 100 takes the form of a HDD, instead of using a L-to-P address map 115, the memory device controller 110 can use an allocation table, an algebraic mapping algorithm, or a defect mapping table to perform the translation. It should also be noted that the various controllers, blocks, and interfaces can be implemented in any suitable fashion. For example, a controller can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example.

Figure 2:
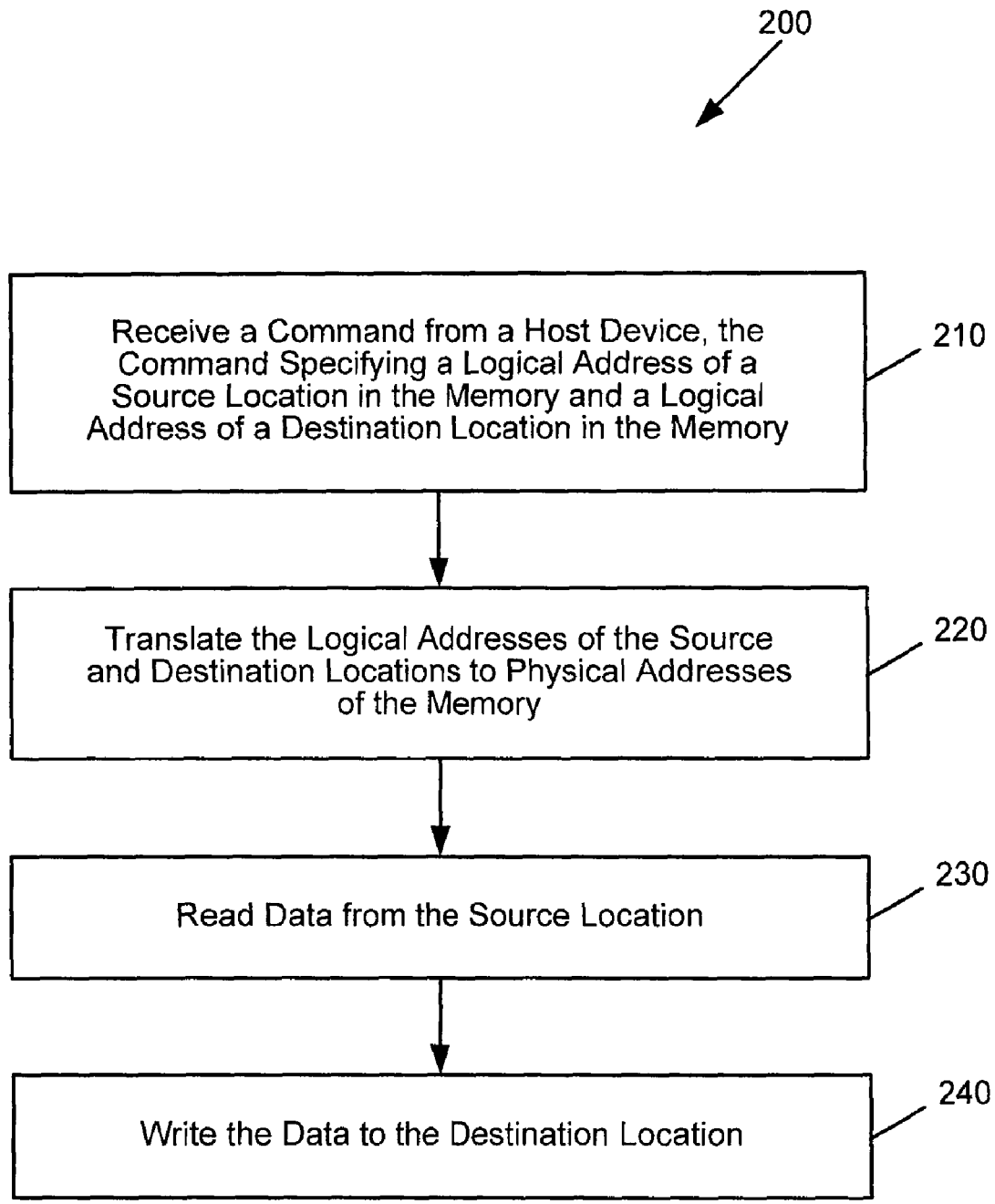
FIG. 2 is a flow chart of a method of an embodiment for writing data from a source location to a destination location in a memory device.

Turning back to the drawings, FIG. 2 is a flow chart 200 of a method for writing data from a source location to a destination location in the memory 130. First, the host device interface 105 receives a command from the host device 50, the command specifying a logical address of a source location in the memory 130 and a logical address of a destination location in the memory 130 (act 210). In response to receiving this command, the host device interface 105 can send an acknowledge signal back to the host device 50 to release the communication bus 150 after receiving the command. Next, the memory device controller 110 translates the logical addresses of the source and destination locations to physical addresses of the memory 130 (act 220). The memory device controller 110 can perform this translation by consulting the L-to-P address map 115, when such is present. Next, the memory device controller 110 reads the data from the source location in the memory 130 (act 230) and then writes the data to the destination location in the memory 130 (act 240). During this process, the ECC block 120 can perform an ECC operation on the data read from the source location in the memory 130.

It should be noted that, with this method, the data is read from the source location in the memory 130 and written to the destination location in the memory 130 without the need of further involvement of the host device 50 after the host device 50 sends the command to the memory device 100. In this way, this method overcomes the disadvantages discussed above of the current process of copying and moving data in a memory device. Since the host device 50 is not involved with the copy/move operation after it sends the initial command, the host device controller 70 in the host device 50 is free to perform other activities or just save power. Further, after the host device interface 105 sends an acknowledge signal back to the host device 50, the communication bus 150 is no longer dedicated to the copy/move operation and is, therefore, available for other communications. This saves time (since a communication protocol is not involved) and provides protection from communication errors and from of bus problems, including for example, the introduction of new errors, delays, and bus occupancy.

With the general method now described, the following paragraphs present details on various formats that can be used. It should be noted that these details are merely examples and should not be read into the claims unless explicitly recited therein. It is also contemplated that some of these formats can be added as a new communication protocol command to an existing interface standard, such as ATA/SCSI, SATA, SCSI (T10), USB 3.0, or SD 3.0, for example. Alternatively, these commands can be vendor-unique features.

One format issue relates to whether or not to specify an amount of data to handle in the operation. As mentioned above, the command from the host device 50 identifies the logical addresses of the source and destination locations (e.g., the "from_sector" and "to_sector"). In addition to specifying the logical addresses of the source and destination locations, the command can specify an amount of data (e.g., a number of sectors) to handle from the starting address. Alternatively, the amount of data to be handled from a given location can be imputed, so there would be no need to specify an amount of data to handle (e.g., in the case where the memory device 100 operates on a single-sector or single-page basis).

Another format issue relates to the disposition of the data at the source location after the data is written to the destination location. For example, in a typical copy operation, the data remains in the source location, whereas, in a typical move operation, some action may or may not be taken with respect to the data in the source location. In one embodiment, the command itself specifies a disposition of the data at the source location. For example, the command can comprise a parameter (e.g., a flag in the command string) that specifies the disposition of the data at the source location. In another embodiment, the disposition of the data at the source location is implicit in the command's schematic. For example, a "COPY_SECTORS" command can be defined such that the semantics of the command itself implies that the original sectors of data are to remain undisturbed after the data is written to the destination location. Similarly, a "MOVE_SECTORS" command can be defined such that the semantics of the command itself implies that some action is to be taken (e.g., logically delete the data in the source sectors) after the data is written to the destination location.

As noted above, disposition of the data at the source location can take various forms. For example, one type of disposition is to leave the data at the source location as-is. This type of disposition is consistent with what is typically considered a "copy" operation, since the data at the source location is left intact. Another type of disposition is to physically erase (e.g., either as a simple, one-pass erase or as a multi-pass secure erase) the data at the source location (e.g., by overwriting the data at the source location with zeroes). This type of disposition is consistent with what is typically considered a "move" or "cut-and-paste" operation, since the data at the source location is removed. This type of disposition may be preferred in security environments, where it is desired to avoid leaving data "residue" behind. Yet another type of disposition is to logically delete the data at the source location, which is referred to as "trimming." With this type of disposition, the data at the source location is not physically erased, but an entry for the data in an allocation table or metadata for the file is marked as deleted, as invalid, or as unwritten. In this way, the trimmed sectors can be ignored in a garbage collection cycle, so they do not have to be moved. Since the data at the location is not physically erased, it can later be reclaimed, if desired. While either deleting or trimming can be used in certain types of memory devices, such as solid-state drives or other types of flash memory devices, trimming may not be an available option with memory devices that do not have an allocation table, such as hard disk drives. As yet another example of disposition types, a command can indicate a "don't care" condition for the data at the source location.

A host device can choose to use the copy/move command in any suitable situation. For example, a host device can issue a copy/move command in conjunction with a garbage collection operation or a wear leveling operation. In this way, the memory device can decide to wait to execute the command until it performs internal garbage collection or wear leveling tasks. As another example, a host device can issue a copy/move command as part of a disk defragmentation operation. On memory devices, such as hard disk drives, "white space" is left in the memory over time because copying or deleting files of different sizes or appending a file can create multiple fragments. Disk defragmentation puts all logical pieces of data physically together to eliminate the "white space" in the memory. A host device can issue the copy/move commands as part of the disk defragmentation operation to accelerate this operation. In this way, a solid-state drive can optimize the execution of either a copy command or a move command by combining it with a wear leveling or garbage collection operation performed by the solid-state drive as part of its internal operations. For example, if the source data is located in the middle of a block but a range of sectors is moved or copied, a space allocator in the memory device controller can re-align these sectors to the start of a block (with a move command, the source range can be trimmed or deleted). Because copy operations are performed frequently on a solid-state drive, these embodiments can be used to boost performance.

As other examples, a host device can issue a copy/move command as part of a file system copy operation (e.g., when copying from one sub-directory to another without involving the host device), as part of a file open/copy-on-write operation (e.g., copying a file when it is opened, writing to the copy instead of to the original file, and committing the copy and erasing the old one upon a save operation (if the copy is closed without saving, the copy is not kept)), or as part of a backup operation (e.g., making a logical copy of everything in all or part of the memory). These embodiments make these operations run faster, since the host device would not be involved in the operations after issuing the command.

As mentioned above, once the memory device receives the copy/move command from the host device, it can send an acknowledge signal back to the host device and release the communication bus, since the memory device controller performs the copy/move operation locally and no longer needs the interface. The memory device controller can perform the copy/move operation as a background operation of the memory device. However, while the memory device can prioritize when to execute the command (in part or in full), it is preferred that the memory device respect the semantics of later reads and writes to preserve temporal ordering. Consider, for example, the situation in which the host device sends a command to move a 100 MB region as part of a disk defragmentation operation. Since 100 MB may take a relatively long time to move, the memory device controller can by asynchronous in the sense that it is run in the background. If, during this time, the host device reads or writes data in some other memory area, the memory device controller can interrupt that move operation and perform the new read/write command. However, if the read/write operation occurs in the memory area that is the subject of the move command, the memory device controller would perform these commands synchronously to make sure the correct data is being read or written, or at least behave as if the commands were performed synchronously.

There are many alternatives that can be used with these embodiments. For example, while hard disk drives and solid state drives were discussed in the forgoing examples, as noted above, any type of suitable memory device can be used. Further, these embodiments can be used in a RAID subsystem to achieve similar advantages in optimizing performance and resource utilization, while taking advantage of efficiencies in RAID parity calculations and the number of physical I/Os performed. Accordingly, these embodiments can be used to make RAID controllers and subsystems more efficient.

Figure 3:
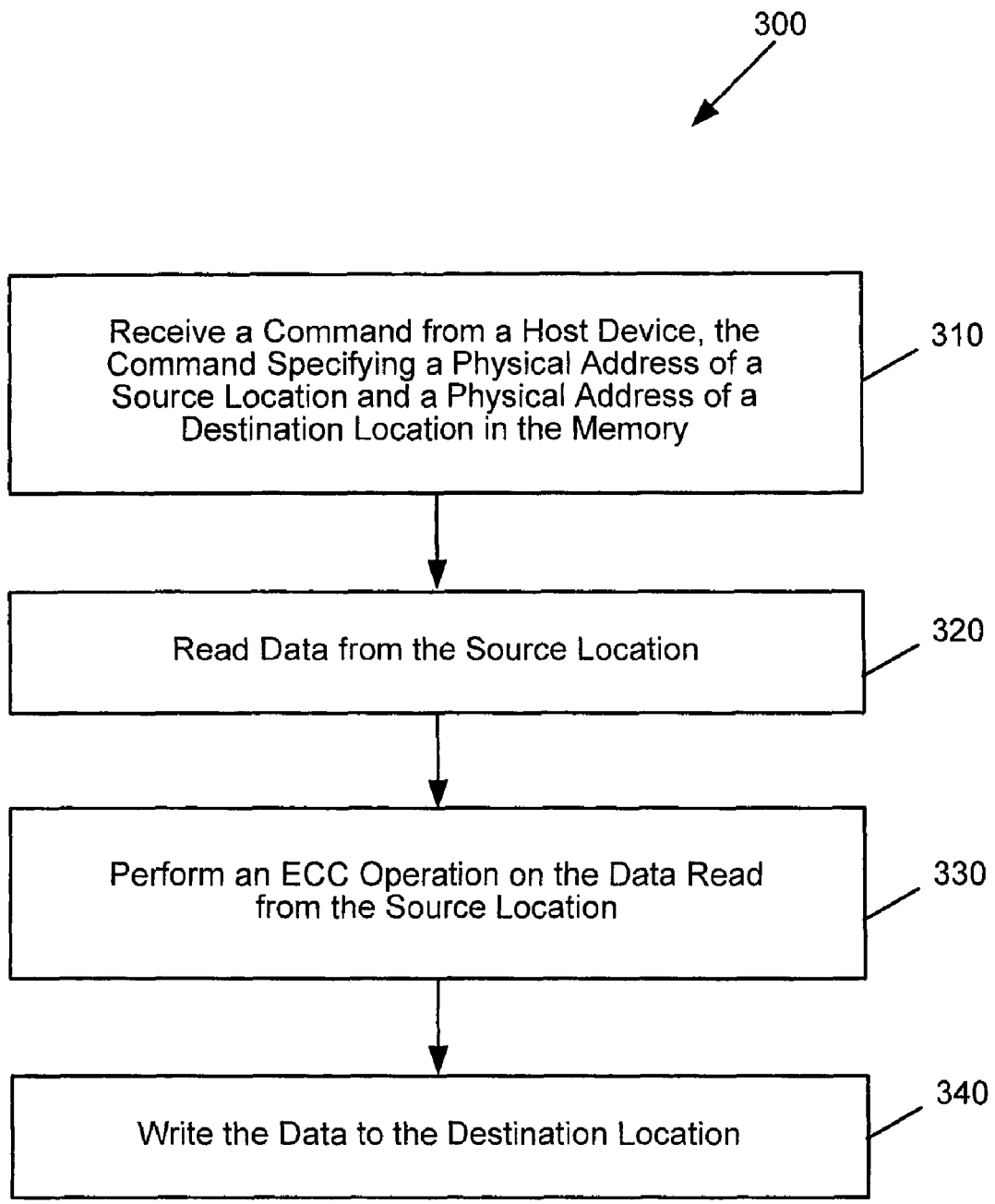
FIG. 3 is a flow chart of a method of another embodiment for writing data from a source location to a destination location in a memory device.

Returning to the drawings, the flow chart 300 in FIG. 3 presents a method of another alternate embodiment. In this embodiment, the memory device receives a command from the host device that specifies physical addresses (not logical addresses) of source and destination locations in the memory (act 310). The memory chip itself executes the command by reading data from the source location (act 320) and writing the data to the destination location (act 340). However, unlike prior memory devices, the memory device controller performs an ECC operation on the data read from the source location (act 330). Because the memory device controller performs an ECC operation, the memory device checks and regenerates ECC to prevent any errors in the data from propagating. To optimize this operation, instead of transferring all the data serially, the data can be transferred in parallel to help improve performance.

As mentioned in some of the embodiments above, a memory device can execute a command to write data from a source location to a destination location by reading the data from the source location and then writing the data to the destination location. However, as mentioned above, the memory device can avoid this read/write operation entirely and simply change its internal host-to-memory mapping (e.g., its logical-to-physical address map 115). This alternative will now be further discussed in conjunction with FIGS. 4A and 4B.

Consider the situation in which the host device 50 issues a command to write the data that is stored at logical address 1 to logical address 2. FIG. 4A is an illustration of the logical-to-physical address map 115 at the time the memory device 100 receives the command. As shown in FIG. 4A, the logical-to-physical address map 115 associates logical address 1 with physical address 1001 and specifies that logical address 2 is free. In some of the embodiments described above, the memory device 100 would execute this command by reading the data at physical address 1001, writing the data to a new physical address, and then associating logical address 2 with that new physical address in the logical-to-physical address map 115. In this alternate embodiment, instead of performing those read/write operations, the memory device 100 executes this command by changing the memory device's logical-to-physical address map 115 without actually reading and writing the data. So, in this example, the memory device 100 would execute the command to write the data from logical address 1 to logical address 2 by associating logical address 2 with physical address 1001 without actually reading the data from physical address 1001 and writing the data to a different physical address. The data in question is still stored in physical address 1001, but the mapping has been changed. When the host device 50 issues a command to read data stored at logical address 2, the data from physical address 1001 will be read, in accordance with the updated mapping.

It should be noted that, like the embodiments described above in which read/write operations are used to execute the command, in this embodiment, the memory device 100 executes the command without a need of further involvement of the host device 50 after the host device 50 sends the command to the memory device 100. However, since read/write operations are not used to execute the command in this embodiment, there is less "wear and tear" on the memory cells, as reading and writing to the cells is avoided. Also, depending on the amount of data involved, executing the command by changing the memory device's logical-to-physical address map 115 without actually reading and writing data may require less power and processing time by the memory device's controller 110.

As with the embodiments described above, mechanisms can be implicitly or explicitly provided to address the disposition of the data at the source location after the command has been executed. For example, in the embodiment shown in FIG. 4B, the data at the source location is logically deleted in that logical address 1 becomes associated with a free physical address. (This is consistent with a typical "move" command.) In this way, the host device 50 can send a subsequent command to write data in logical address 1 since it is designated as being free. Alternatively, the data at the source location can be left intact, such that both logical address 1 and logical address 2 would both point to physical address 1001. (This is consistent with a typical "copy" command.) In this way, the host device 50 would receive the data stored at physical address 1001 when it reads data from either logical address 1 or logical address 2.

It should be noted that the features described above in conjunction with one embodiment can be used with any of the other embodiments described herein and that each embodiment can be used alone or in combination with one or more of the other embodiments. For example, a command to write data to a destination location can be executed partially by performing read/write operations for some of the data (e.g., for a relatively smaller part of the data) and by updating the logical-to-physical address map for the rest of the data (e.g., for a relatively larger part of the data).

It is intended that the foregoing detailed description be understood as an illustration of selected forms that the invention can take and not as a definition of the invention. It is only the following claims, including all equivalents, that are intended to define the scope of this invention. Finally, it should be noted that any aspect of any of the preferred embodiments described herein can be used alone or in combination with one another.

What is claimed is:

1. A method for executing a command to write data from a source location to a destination location in a memory device, the method comprising:
   with a memory device comprising a memory and a logical-to-physical address map:
   (a) receiving, from a host device, a command to write data from a source location to a destination location in a memory device, wherein the command specifies a logical address of the source location in the memory and a logical address of the destination location in the memory, and wherein the command further specifies what is to happen to the data at the source location after the command is executed;
   (b) translating the logical addresses of the source and destination locations to physical addresses of the memory; and
   (c) executing the command by changing the memory device's logical-to-physical address map without reading the data from the source location and writing the data to the destination location;
   wherein the memory device executes the command without a need of further involvement of the host device after the host device sends the command to the memory device.

2. The method of claim 1, wherein the memory device is in communication with the host device via a bus, and wherein the method further comprises releasing the bus after receiving the command.

3. The method of claim 1, wherein the command specifies an amount of data to handle.

4. The method of claim 1, wherein the command specifies that the data at the source location is to be left intact.

5. The method of claim 1, wherein the command specifies that the data at the source location is to be logically deleted.

6. The method of claim 1, wherein the command comprises a parameter that specifies what is to happen to the data at the source location after the command is executed.

7. The method of claim 1, wherein what is to happen to the data at the source location is implicit in the command's schematic.

8. The method of claim 1, wherein (c) is performed as a background operation of the memory device.

9. The method of claim 1, wherein (c) is performed in conjunction with a wear leveling operation.

10. The method of claim 1, wherein (c) is performed in conjunction with a garbage collection operation.

11. The method of claim 1, wherein the command is issued by the host device as part of a disk defragmentation operation.

12. The method of claim 1, wherein the command is issued by the host device as part of a file system copy operation.

13. The method of claim 1, wherein the command is issued by the host device as part of a file open/copy-on-write operation.

14. The method of claim 1, wherein the command is issued by the host device as part of a backup operation.

15. The method of claim 1, wherein the memory device comprises a hard disk drive.

16. The method of claim 1, wherein the memory device comprises a solid state drive.

17. The method of claim 1, wherein the memory device is part of a redundant array of independent disks (RAID).

18. The method of claim 1, wherein the memory device comprises a removable memory card.

19. The method of claim 1, wherein the memory device comprises a memory card embedded in the host device.

20. The method of claim 1, wherein the memory comprises of a raw NAND die.

* * * * *